(12) United States Patent
Juy et al.

(10) Patent No.: US 9,091,425 B2
(45) Date of Patent: Jul. 28, 2015

(54) HEAT-CONDUCTING AND HEAT-DISSIPATING NANO-MATERIALS, PREPARING METHOD THEREOF AND HEAT-DISSIPATING SYSTEM

(75) Inventors: King Sun Juy, Kowloon (HK); Man Wah Hui, Kowloon (HK)

(73) Assignee: Green Formula Limited, Hong Kong (HK)

( * ) Notice: Subject to any disclaimer, the term of this patent is extended or adjusted under 35 U.S.C. 154(b) by 148 days.

(21) Appl. No.: 13/824,454

(22) PCT Filed: Jun. 10, 2011

(86) PCT No.: PCT/CN2011/075580
§ 371 (c)(1),
(2), (4) Date: May 10, 2013

(87) PCT Pub. No.: WO2012/167440
PCT Pub. Date: Dec. 13, 2012

(65) Prior Publication Data
US 2014/0152167 A1 Jun. 5, 2014

(51) Int. Cl.
*F21V 29/70* (2015.01)
*F21V 29/00* (2015.01)
*C09K 5/14* (2006.01)

(52) U.S. Cl.
CPC . *F21V 29/22* (2013.01); *C09K 5/14* (2013.01); *F21V 29/70* (2015.01)

(58) Field of Classification Search
CPC .............. F21V 29/22; F21V 29/70; C09K 5/14
USPC ................. 313/46; 252/70; 524/404; 165/185
See application file for complete search history.

(56) References Cited

U.S. PATENT DOCUMENTS

2004/0068036 A1\* 4/2004 Halladay et al. .............. 524/439

FOREIGN PATENT DOCUMENTS

| AU | 2009202013 B2 | 12/2010 |
| CN | 201513856 U | 6/2010 |
| CN | 201589116 I | 9/2010 |
| CN | 201621662 U | 11/2010 |

\* cited by examiner

*Primary Examiner* — Anne Hines
(74) *Attorney, Agent, or Firm* — Wendy K. Marsh

(57) ABSTRACT

The invention provides a heat-conducting and heat-dissipating nano-material, a method for preparation thereof and a heat-dissipating system. The method comprises the following steps: i) mixing a complex formed by a high molecular material and a substance having heat conduction and heat dissipation properties with tert-butyl acetate and 4-Chlorobenzotrifluoride, wherein the complex is of nano scale in particle size; and ii) placing a mixture obtained from step i) into water and stirring the mixture in water for a period of time to afford the heat-conducting and heat-dissipating material. Application of the heat-conducting and heat-dissipating material in a heat-dissipating system of LED light may simplify the manufacturing process, save raw materials used and reduce weight and size of heat sink of the heat-dissipating system.

18 Claims, 3 Drawing Sheets of the heat-dissipating system of the LED lighting devices. The present invention introduces a novel heat-dissipating system taking advantage of nano-materials, which not only improves the heat dissipation efficiency but also allows the lighting devices to work in a stable condition while implementing a compact and light structure at a low cost.

HEAT-CONDUCTING AND HEAT-DISSIPATING NANO-MATERIALS, PREPARING METHOD THEREOF AND HEAT-DISSIPATING SYSTEM

FIELD OF THE INVENTION

The present invention relates to the technical field of heat-conduction and heat-dissipation. Specifically, the present invention relates to a method for preparing a heat-conducting and heat-dissipating nano-material, the heat-conducting and heat-dissipating nano-material produced therefrom, and a heat-dissipating system comprising the heat-conducting and heat-dissipating nano-material.

BACKGROUND OF THE INVENTION

Light emitting diode (LED) has a great potential of development among solid light sources, and receives increasing attention from people by virtue of its advantages of long lifespan, firm structure, low energy consumption and flexible appearance and size. In recent years, LED lighting devices are becoming inexpensive and thus gradually replace traditional lights used in various occasions of illumination. However, heat energy emitted from the LED is quite high during use. If such high heat energy could not be dissipated sufficiently, the working efficiency and the lifespan of various components inside the LED lighting device would be reduced, or some of the components may even fail to work normally or even melt. Therefore, effective dissipation of heat energy generated by LED light source is one of the most important factors to be considered when a LED light device is designed or implemented.

It is generally known that there are three ways of heat transfer: convection, conduction and radiation. Presently, the heat-dissipating system used in LED lighting devices is designed to include:

1. Convection or forced convention: the number of fins is increased to enlarge heat dissipation area and therefore reinforce heat convection and heat conduction effect. FIG. 1 shows a conventional heat sink 1 used in the prior art LED lighting device. The heat sink 1 is surrounded by a plurality of fins 2 in spaced relation. The fins 2 are made using lathe technology, and also undergo black oxide finish to exhibit heat dissipation property of black body radiation. Such a design in heat dissipation results in a bulky and heavy LED lighting device, while its heat dissipation capacity is still limited and the costs of production and materials are very high.

2. Selection of materials with good heat conduction: for example pure aluminum with thermal conductivity of 229 w/mk or pure copper with thermal conductivity of 386 w/mk may be used.

Presently, some LED lighting devices have a heat dissipating silica gel applied between the heat conduction panel and the heat sink. As the silica gel are prone to getting dry to turn into grains, the contact surface between the heat conduction panel and the heat sink are not in close contact each other, which would increase a heat resistance on the contact surface. Accordingly, the heat conduction performance of interface between the light source and the heat sink is greatly reduced. Therefore, it is impossible to acquire good heat dissipation effect.

In order to enhance the heat dissipation capacity of the LED lighting devices, the heat sink may be subject to surface treatment, including but not limited to anodic oxidation treatment and black coating treatment. However, these two methods only bring limited improvement on the heat dissipation capacity of the heat sink in the LED lighting device, particularly in the LED lighting device with high power.

Nanotechnology has found a wide range of applications as a new technology in recent years. The nano-materials are well known for their surface effect, volume effect and quantum size effect, and exhibit many outstanding physical and chemical properties, for example in aspects of melting point, electrical conductivity, thermal conductivity etc. There have been a large number of teachings on the use of nano-materials as heat-conducting and heat-dissipating materials. However, the problem of even dispersion of nano-particles, especially nano-particles with particle size less than 1 nm, in a solvent remains.

In general, the prior art LED lighting devices are very bulky and require labor-intensive manufacturing procedures because their heat dissipation structures are quite bulky and complicated. Therefore, there is a need for improvement on the heat-dissipating system of the LED lighting devices. The present invention introduces a novel heat-dissipating system taking advantage of nano-materials, which not only improves the heat dissipation efficiency but also allows the lighting devices to work in a stable condition while implementing a compact and light structure at a low cost.

SUMMARY OF THE INVENTION

It is the inventors' finding that simultaneous use of tert-butyl acetate (CAS#540885) and 4-Chlorobenzotrifluoride (CAS#98566) as dispersants enables even dispersion of nano-particles with particle size less than 1 inn in the water-soluble solvent such as water so as to afford an emulsion which has particularly excellent performance in heat conduction and heat dissipation.

Based on the above finding, the present invention proposes a new process for preparation of a heat-conducting and heat-dissipating nano-material. The resultant heat-conducting and heat-dissipating nano-material has the ability of effectively and quickly dissipating the heat generated inside the LED lighting device. Due to its excellent heat dissipation effect, the size of heat dissipation structure can be very small, the heat dissipation fins commonly used in the art can even be removed. As a result, the whole lighting device becomes smaller and lighter.

In order to achieve the above objects, the present invention provides a method for preparation of a heat-conducting and heat-dissipating nano-material, characterized by comprising the following steps:

i) mixing a complex formed by a high molecular material and a substance having heat conduction and heat dissipation properties with tert-butyl acetate and 4-Chlorobenzotrifluoride, wherein the complex is of nanoscale in particle size; and ii) placing the mixture obtained from step i) into water and stirring the mixture in water for a period of time to afford the heat-conducting and heat-dissipating material.

According to the present invention, the substance having heat conduction and dissipation properties may be inorganic or organic, and may be selected from the group consisting of ceramic, carbon, paraffin, silica and polymethylsilazane.

Preferably, the complex, the tert-butyl acetate and the 4-Chlorobenzotrifluoride are mixed in a ratio by weight of the complex 20-40%:the tert-butyl acetate 35-45%:the 4-Chlorobenzotrifluoride 25-35%. Based on a total weight of water, the complex, the tert-butyl acetate and the 4-Chlorobenzotrifluoride, the water is used in an amount of about 25-75% weight of the total weight.

The particle size of the complex used in the invention is less than 1 nm.

In step ii), the stirring is performed at an atmospheric pressure and at room temperature for 10-20 minutes. The heat conducting and heat dissipating material is then formed as an emulsion.

A second aspect of the invention relates to a heat-conducting and heat-dissipating nano-material prepared by a method of the invention.

A third aspect of the invention provides a heat dissipating system for a lighting device, comprising a heat conduction panel connected with a light source in a thermally conductive manner, and a heat sink heat sink connected with the heat conduction panel for heat conduction, the heat-conducting and heat-dissipating nano-material of the invention is applied onto a surface of the heat conduction panel in contact with the heat sink, and/or onto an external surface of the heat sink.

In one preferred embodiment of the invention, the heat-conducting and heat-dissipating nano-material applied onto the surface of the heat conduction panel in contact with the heat sink is 0.3-2 mil in thickness, and the heat-conducting and heat-dissipating nano-material applied onto the external surface of the heat sink is 0.3-2 mil in thickness.

In order to ensure that the surfaces are sufficiently clean for the application of the heat-conducting and heat-dissipating material for enhanced attachment and prolonged lifespan of the material, the heat conduction panel and the heat sink are pre-treated by sand blast before the application of the material.

In one embodiment of the invention, the light source is one or more LEDs.

In another embodiment of the invention, the heat sink is free of heat-dissipating fins or provided with a small number of fins. The heat conduction panel and the heat sink are made from metal.

Depending on which type of substance having properties of heat conduction and heat dissipation is used, the heat-conducting and heat-dissipating nano-material of the invention varies in its heat conduction performance and heat dissipation performance. For example, the heat-conducting and heat-dissipating material made from the complex formed by high molecular material and ceramic would have better heat conductivity, which is more suitable to be coated between the heat conduction panel and the heat sink to transfer the heat generated by the LED light source to the heat sink by heat conduction and also by heat radiation as a supplementary means. The heat-conducting and heat-dissipating material made from the complex formed by high molecular material and silica would have better performance in heat dissipation, which is more suitable to be coated on the external surface of the heat sink so as to transfer the heat to the ambient by the way of radiation.

The heat-conducting and heat-dissipating nano-material of the present invention is viscous, and can be naturally cured within half an hour. This allows the material to adhere the heat conduction panel and heat sink together.

The heat-conducting and heat-dissipating material of the present invention is of nano-particles, particularly nano-particles with sizes less than 1 nm, they can be easily and evenly dispersed in the water-soluble solvent in the presence of both tert-butyl acetate and 4-Chlorobenzotrifluoride used as the dispersing agents to give a homogenous emulsion. The present invention has not only solved the problems of even dispersion of the nano-particles in the solvent, but also acquired the emulsion with excellent performance in heat conduction and heat dissipation. It is found that coating of this emulsion between the heat conduction panel and the heat sink as well as on the external surface of the heat sink can transfer quickly the heat generated by the LED light source to the surface of the heat sink through heat conduction or heat convection, and the heat is then dissipated from the heat sink to the ambient by heat radiation, thereby conferring the active heat dissipation ability on the heat sink. Since the nano-material of the present invention has greatly increased the heat dissipation efficiency of the LED light, in some cases the fins may be removed from the heat sink. Such a heat sink thus has simple structure with light weight and small size, and the cost on raw materials can be reduced significantly.

As stated above, depending on which type of substance having properties of heat conduction and heat dissipation is used, the heat-conducting and heat-dissipating nano-material of the invention varies in its heat conduction performance and heat dissipation performance. The material selected for the coating between the heat conduction panel and the heat sink preferably has better heat conductivity and therefore the heat-conducting and heat-dissipating material made from the complex formed by high molecular material and ceramic may be used. The material selected for the coating on the surface of the heat sink preferably has better performance in heat dissipation, and therefore the heat-conducting and heat-dissipating material made from the complexes formed by high molecular material and silica may be used.

The following paragraphs will further illustrate and explain the conceptions, structures and technical effects of the present invention with reference to the drawings, so as to allow for a better understanding of the objects, features and effects of the present invention.

BRIEF DESCRIPTION OF THE DRAWINGS

The further objects, features, characteristics and effects of the invention will be illustrated in more details by way of examples with reference to the accompany drawings, wherein.

DETAILED DESCRIPTION OF THE PREFERRED EMBODIMENTS

Figure 1:
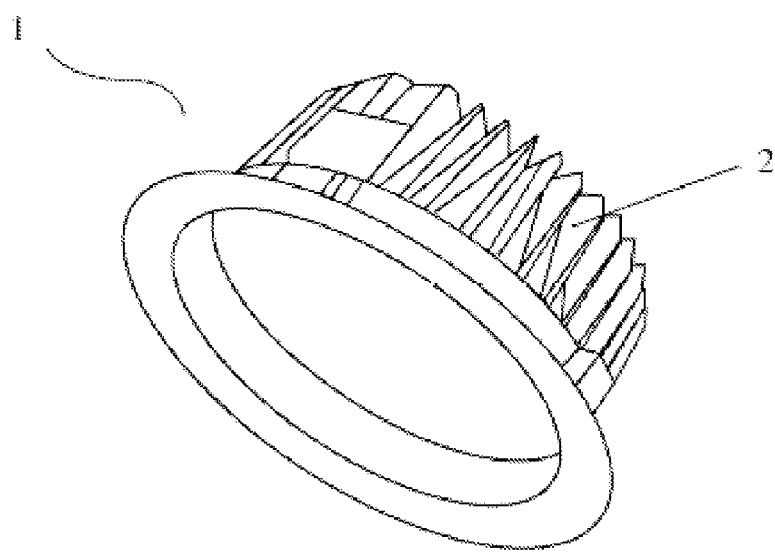
FIG. 1 is a schematic view of a heat sink adopted by an existing LED lighting device.

For illustrative purpose, two heat-conducting and heat-dissipating nano-materials according to the invention are prepared respectively using water-soluble high molecular ceramic complex with particle size smaller than 1 nanometer (nm) and water-soluble high molecular silica complex with particle size smaller than 1 nanometer (nm) as raw materials.

The commercially available water-soluble high molecular ceramic complex (from a variety of commercial sources) is mixed with tert-butyl acetate (CAS#540885) and 4-Chlorobenzotrifluoride (CAS#98566) at a predetermined ratio, the mixture is placed into water and stirred for about 10-20 minutes at room temperature and atmospheric pressure, the desired heat-conducting and heat-dissipating nano-material is then formed as a homogenous viscous emulsion.

The high molecular ceramic complex, tert-butyl acetate (CAS#540885) and 4-Chlorobenzotrifluoride (CAS#98566) are mixed at the following ratio by weight:

High molecular ceramic complex: 20-40%
Tert-butyl acetate: 35-45%
4-Chlorobenzotrifluoride: 25-35%

The amount of water used can be 25-75% of the total weight of water and the above three substances.

According to one embodiment of the invention, 30% weight of the high molecular ceramic complex, 35% weight of tert-butyl acetate (CAS#540885) and 35% weight of 4-Chlorobenzotrifluoride (CAS#98566) are mixed, and the mixture is placed in water and stirred to afford water-soluble high molecular ceramic emulsion. This emulsion is tested for its typical properties which are given as below:

1. Viscosity: 15 seconds measured at 25° C. by Brookfield 7# testing method;
2. Density: 2.70-2.71 g/cm³ measured at 25° C.;
3. Working temperature: −40☐ to +200☐;
4. Heat conductivity coefficient: 8 W/Mk measured according to ASTM D5470;
5. Dielectric strength: 305V/mil measured according to ASTM D 149;
6. Volume resistivity: $1.65 \times 10^{14}$ ohm-cm measured according to ASTM D257;
7. Bleed reliability: 0.005% measured at 200☐ for 24 hours;
8. Reliability of evaporation capacity: 0.5% measured at 200☐ for 24 hours;
9. Decomposition temperature for 2 hours: 400☐, and
10. Heat radiation efficiency: 10% at heat dissipation speed $\Delta T^4$ at 25☐.

As can be seen, the water-soluble high molecular ceramic of the present invention has a higher heat conductivity coefficient, while its thickness may be made very thin, for example about 1 μm. By contrast with conventional heat conductors which have a thickness in millimeter scale, the water-soluble high molecular ceramic of the present invention is of a reduced significantly thickness, making it possible that the material is used as an excellent heat conductor.

The above high molecular ceramic emulsion can be directly applied on the heat conduction panel configured in the LED lighting device. Due to its mobility, the emulsion tends to flow into gaps among the components and forms a thin dense film after solidification. As all the gaps are provided with the dense film, the efficiencies of heat conduction and heat convection would be increased. Furthermore, the heat conduction panel and the heat sink can be adhered together due to the viscosity of the emulsion. The emulsion is air dried (for about 20 minutes) and would be cured to become a heat conduction coating between the heat conduction panel and the heat sink.

According to the present invention, the water-soluble high molecular ceramic may be provided as a coating in a thickness of preferably 0.3-2 mil, and more preferably 0.5-2 mil.

The water-soluble high molecular silica emulsion is prepared in the same way as the water-soluble high molecular ceramic emulsion. Specifically, the commercially available water-soluble high molecular silica complex having particle size smaller than 1 nm (from a variety of commercial sources) is mixed with tert-butyl acetate (CAS#540885) and 4-Chlorobenzotrifluoride (CAS#98566) at a predetermined ratio, preferably at the following ratio by weight:

High molecular silica complex: 20-40%
Tert-butyl acetate: 35-45%
4-Chlorobenzotrifluoride: 25-35%

Then, the mixture is placed into water and stirred for about 10-20 minutes at room temperature and atmospheric pressure to afford a homogenous viscous emulsion. The amount of water used can be 25-75% of the total weight of water and the above three substances.

According to one embodiment of the invention, the water-soluble high molecular silica emulsion of the present invention is prepared using 30% weight of high molecular silica complex, 35% weight of tert-butyl acetate (CAS#540885) and 35% weight of 4-Chlorobenzotrifluoride (CAS#98566). This emulsion is tested for its typical properties which are given as below:

1. Viscosity: 12 seconds measured at 25° C. by #2 Zahn Cup testing method;
2. Temperature resistance: 980☐ measured by Heat Stability method;
3. Heat radiation efficiency: 30-50% at heat dissipation speed $\Delta T^4$ at 25☐; and
4. Decomposition temperature for 2 hours: 1000-1300☐.

As can be seen, the high molecular silica emulsion has an excellent heat radiation property and is particularly suitable to be applied as a coating on an external surface of the heat sink of LED lighting device, allowing the heat transfer to the ambient by way of heat radiation. The high molecular silica emulsion of the present invention has the characteristics of heat-insulation, electricity-insulation, rust-resistance, acid and base salt-resistance, wear-resistance and the like.

Generally, the high molecular silica emulsion is provided as a coating applied on the external surface of the heat sink in a thickness of preferably 0.3-2 mil, more preferably 0.5-1 mil. This coating is tested and the results are given as follows:

Pencil hardness of the coating: 9H measured according to ASTM D3363;
Coating firmness: 5B measured according to ASTM D3359;
Coating distortion: 18 mm measured according to ASTM D522;
Impact Load of the coating: <10 pound measured according to ASTM D2794.

Figure 2:
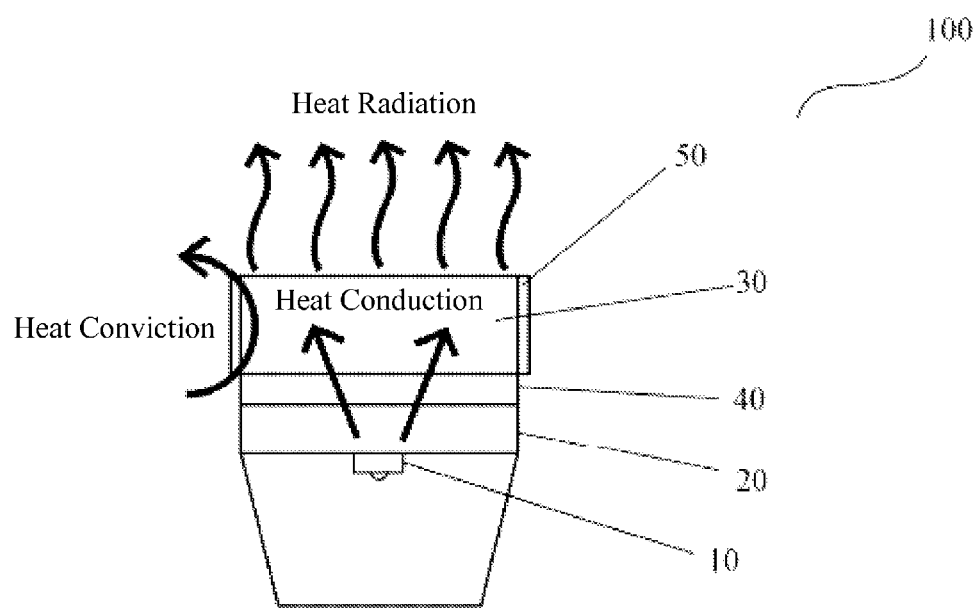
FIG. 2 is a schematic view of a heat-dissipating system of a LED lighting device according to an embodiment of the present invention.

Now referring to FIG. 2, there is illustrated a schematic view of heat-dissipating system of LED lighting device according to a first embodiment of the present invention. The LED lighting device 100 comprises a LED light source 10, a heat conduction panel 20 supporting the LED light source 10 and in contact with the LED light source 10 in thermally conductive manner, and a heat sink 30. The LED light source 10 can be one or more LED chips, the heat conduction panel 20 and the heat sink 30 can be made from metal such as aluminum. This is not the essence of the present invention, and therefore will not be detailed herein. Other structures of the LED lighting device may be made reference to the prior art technology and not described either.

The heat dissipating system of the LED lighting device according to the present invention is characterized by the application of the heat-conducting and heat-dissipating nano-material of the present invention between the heat conduction panel 10 and the heat sink 30 as well as on the external surface of the heat sink 30. In this embodiment, the water-soluble high molecular ceramic emulsion discussed above is applied between the heat conduction panel 10 and the heat sink 30, while the water-soluble high molecular silica emulsion discussed above is applied on the external surface of the heat sink 30. In order to enhance the attachment of the material and extend the lifespan of the material, the coating surface is subject to thorough cleaning treatment. For this purpose, the heat conduction panel and the heat sink have to be pre-treated by sand blast.

As shown in FIG. 2, the heat conduction panel 20 and the LED light source 10 are secured together in thermally conductive manner, allowing the heat transfer from the LED light source 10 to the heat conduction panel 20, and then to the heat sink 30 through the high molecular ceramic coating 40 by way of both heat conduction and heat convection. The heat is subsequently dissipated rapidly by the high molecular silica coating 50 on the external surface of the heat sink 30.

Figure 3:
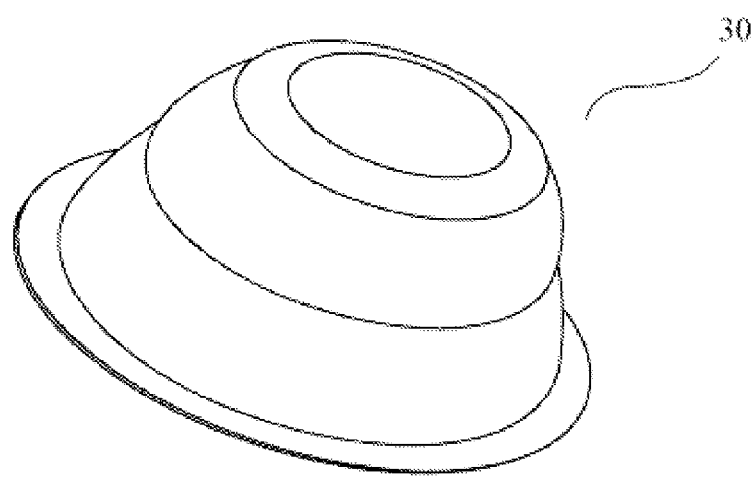
FIG. 3 is a schematic view of a heat sink according to an embodiment of the present invention.

FIG. 3 shows a schematic view of the heat sink 30 constructed according to the present invention. As shown in the figure, the external surface of the heat sink 30 is free of a heat-dissipating fin, unlike the prior art heat sinks. The heat sink 30 is about 1 mm in thickness and made from T6063 aluminum alloy by spinning technology. Since no heat-dissipating fins are configured, it is possible that the heat sink is made by spinning, casting, punching and forging technologies in place of lathe technology, which simplifies the manufacturing process of the heat sink. Moreover, the elimination of fins permits reduction in weight of the heat sink 30 by about ¾. Furthermore, the heat sink 30 requires no treatment such as anodic oxidation treatment or black oxide finish, and thus the manufacturing cost can be greatly reduced.

A comparison between the prior art heat sink shown in FIG. 1 and the heat sink 30 of the present invention shown in FIG. 3 has been conducted, and the comparison results are illustrated in the following table:

|  | Prior art heat sink shown in FIG. 1 | Heat sink of the invention* | Effect of the invention |
| --- | --- | --- | --- |
| Appearance of heat sink | Cylindrical: Φ150 × 80 mm | Cylindrical: Φ210 × 95 mm |  |
| Number of fins | 38 | 0 | Elimination of manufacturing of fins |
| Wall thickness of heat sink | 2 mm | 1 mm | Reduction in wall thickness by a half |
| Material used | ADC12 casting aluminum alloy | T6063 spinning aluminum alloy | Simplification of manufacturing process |
| Surface treatment | Anodic oxidation and black oxide finish | Application a coating of high molecular silica | Simplification of pre-treatments |
| Weight | 560 g | 135 g | Reduction in weight by 75% |
| Heat dissipation efficiency (calculated by CFD simulation software) | Room temperature around the heat sink: 27□~45□ | Room temperature around the heat sink: 27□-65□ | Increase in room temperature by 20° C., suggesting the increase in heat dissipation capacity of the heat sink by 30% |

*The tested heat sink has a coating of the water soluble high molecular ceramic emulsion applied between the heat conduction panel and the heat sink, and a coating of the water soluble high molecular silica emulsion applied on the external surface of the heat sink.

The above comparison results revealed that the heat sink of the LED lighting device constructed according to the present invention can be thinner and lighter, and may require no heat-dissipating fins. So the weight of such a heat sink is at least reduced by 40-50% or even 75% compared with the conventional heat sinks having the fins Even no fin is provided on the heat sink of the present invention, its heat dissipation capacity is improved by at least 20-30% compared with the conventional heat sinks having the fins, if the heat-dissipating and heat-conducting materials of the present invention are applied between the heat conduction panel and the heat sink as well as on the external surface of the heat sink. Besides, the manufacturing process of the heat sink is simplified significantly, and the materials required for manufacturing the body of the heat sink and the heat-dissipating fins are reduced as well. Accordingly, raw materials can be saved, and the manufacturing cost can be reduced significantly.

Of course, it is possible to have the heat dissipating fins on the surface of the heat sink 30 according to the actual needs, but the number of the fins can be small. Provision of the fins on the heat sink of the invention would further enhance the heat dissipation effect thereof.

The application of the heat-conducting and heat-dissipating nano-materials prepared by the method of the present invention in the heat-dissipating system of LED lighting device is discussed above. It is understood that such heat-conducting and heat-dissipating nano-materials can find applications in other fields and occasions which require heat conduction and heat dissipation (such as flat heat sinks in electronic structure), with the advantages of excellent heat dissipation effect, simplified manufacturing process and reduced manufacturing cost.

While the preferred embodiments are described hereinabove, it will be appreciated by those skilled in the art that the present invention is not limited to the embodiments illustrated. Those skilled in the art will envision many other possible variations and modifications by means of the skilled person's common knowledge without departing from the scope of the invention, however, such variations and modifications should fall into the scope of this invention.

What is claimed is:

1. A method for preparation of a heat-conducting and heat-dissipating nano-material, characterized by comprising the following steps:
    i) mixing a complex formed by a high molecular material and a substance having heat conduction and heat dissipation properties with tert-butyl acetate and 4-Chlorobenzotrifluoride, wherein the complex is of nano scale in particle size; and
    ii) placing the mixture obtained from step i) into water and stirring the mixture in water for a period of time to afford the heat-conducting and heat-dissipating material;
    whereby the complex, the tert-butyl acetate and the 4-Chlorobenzotrifluoride are mixed in a ratio by weight of the complex 20-40%:the tert-butyl acetate 35-45%: the 4-Chlorobenzotrifluoride 25-35%.

2. The method according to claim 1, characterized in that based on a total weight of water, the complex, the tert-butyl acetate and the 4-Chlorobenzotrifluoride, the water is used in an amount of about 25-75% weight of the total weight.

3. A heat-conducting and heat-dissipating nano-material prepared by the method according to claim 2.

4. The method according to claim 1, characterized in that the particle size of the complex is less than 1 nm.

5. A heat-conducting and heat-dissipating nano-material prepared by the method according to claim 4.

6. The method according to claim 1, characterized in that in step ii), the stirring is performed at an atmospheric pressure and at room temperature for 10-20 minutes.

7. The method according to claim 1, characterized in that the heat conducting and heat dissipating material is formed as an emulsion.

8. A heat-conducting and heat-dissipating nano-material prepared by the method according to claim 1.

9. A heat dissipating system for a lighting device, comprising a heat conduction panel connected with a light source in a thermally conductive manner, and a heat sink connected with the heat conduction panel for heat conduction, characterized in that the heat-conducting and heat-dissipating nano-material according to claim 8 is applied onto a surface of the heat conduction panel in contact with the heat sink, and/or onto an external surface of the heat sink.

10. The heat dissipating system according to claim 9, characterized in that the light source is one or more LEDs.

11. The heat dissipating system according to claim 9, characterized in that the heat-conducting and heat-dissipating nano-material applied onto the surface of the heat conduction panel in contact with the heat sink is 0.3-2 mil in thickness.

12. The heat dissipating system according to claim 9, characterized in that the heat-conducting and heat-dissipating nano-material applied onto the external surface of the heat sink is 0.3-2 ml in thickness.

13. The heat dissipating system according to claim 9, characterized in that the heat sink is free of heat-dissipating fins.

14. The heat dissipating system according to claim 9, characterized in that the heat conduction panel and the heat sink are made from metal.

15. The heat dissipating system according to claim 9, characterized in that the heat conduction panel and the heat sink are pre-treated by sand blast before the application of the heat-conducting and heat-dissipating material.

16. The heat dissipating system according to claim 9, characterized in that the heat-conducting and heat-dissipating nano-material applied onto the surface of the heat conduction panel in contact with the heat sink is a water-soluble high molecular ceramic emulsion, and the heat-conducting and heat-dissipating nano-material applied onto the external surface of the heat sink is a water-soluble high molecular silica emulsion.

17. A method for preparation of a heat-conducting and heat-dissipating nano-material, characterized by comprising the following steps:
   i) mixing a complex formed by a high molecular material and a substance having heat conduction and heat dissipation properties with tert-butyl acetate and 4-Chlorobenzotrifluoride, wherein the complex is of nano scale in particle size; and
   ii) placing the mixture obtained from step i) into water and stirring the mixture in water for a period of time to afford the heat-conducting and heat-dissipating material;
   and further providing that the substance having heat conduction and dissipation properties is selected from the group consisting of ceramic, carbon, paraffin, silica and polymethylsilazane.

18. A heat-conducting and heat-dissipating nano-material prepared by the method according to claim 17.

* * * * *